March 10, 1953 W. VAN B. ROBERTS 2,631,193
ELECTROMECHANICAL FILTER
Filed Feb. 15, 1949 3 Sheets-Sheet 1
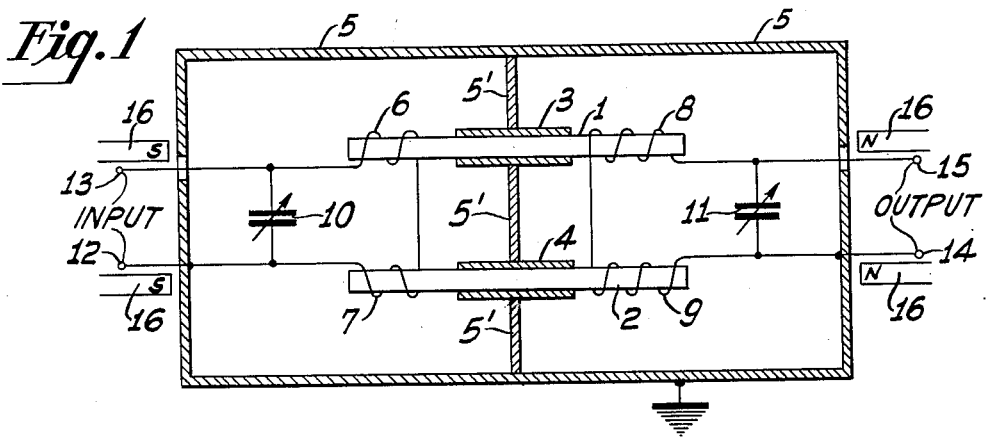
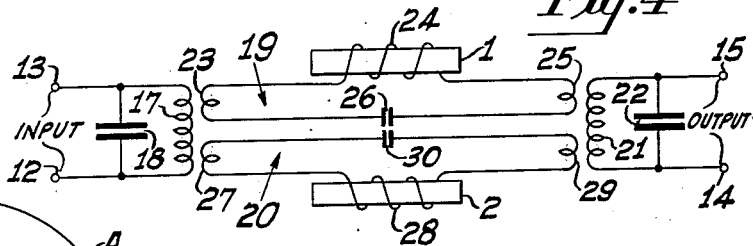
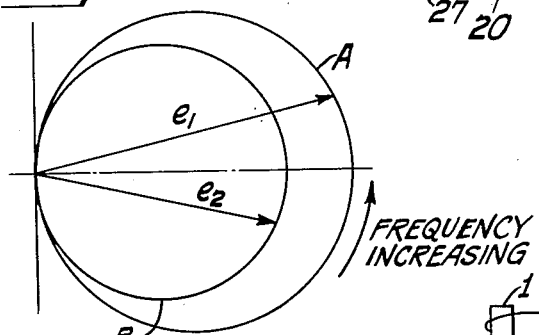
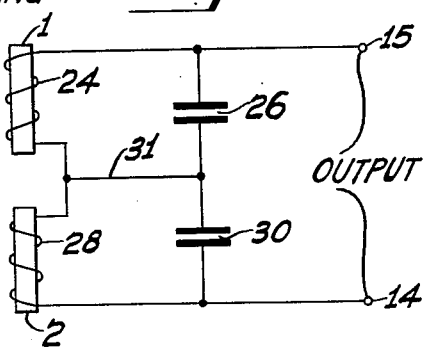
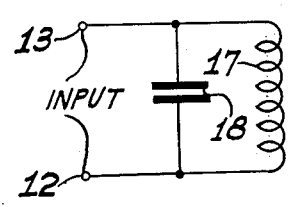
INVENTOR
*Walter van B. Roberts*
BY Harry Tumick
ATTORNEY Patented Mar. 10, 1953

2,631,193

UNITED STATES PATENT OFFICE 2,631,193

ELECTROMECHANICAL FILTER

Walter van B. Roberts, Princeton, N. J., assignor to Radio Corporation of America, a corporation of Delaware Application February 15, 1949, Serial No. 76,586

17 Claims. (Cl. 178—44)

This invention relates to filters for wave energy, and more particularly to electromechanical filters of the band-pass type.

An object of this invention is to devise a filter which has a substantially flat-topped narrow frequency-output characteristic, such characteristic also having steep sides at the edges of the pass band.

Another object is to devise a mechanical-type filter which will act as a narrow band pass filter at frequencies where electrical filters are much less effective.

A further object is to provide a rather simple and inexpensive electromechanical filter which accomplishes its filtering action by purely mechanical vibratory phenomena.

The foregoing and other objects of the invention will be best understood from the following description of some exemplifications thereof, reference being had to the accompanying drawings, wherein:

Fig. 1 is a partly diagrammatic, partly cross-sectional view of a differential filter according to this invention;

Fig. 2 is a voltage locus diagram explaining the operation of the filter in Fig. 1;

Fig. 4 is a preferred embodiment of a circuit for utilizing the differential filter of this invention;

Figs. 5 and 6 are other embodiments of circuits for the differential filter of this invention;

Figure 3:
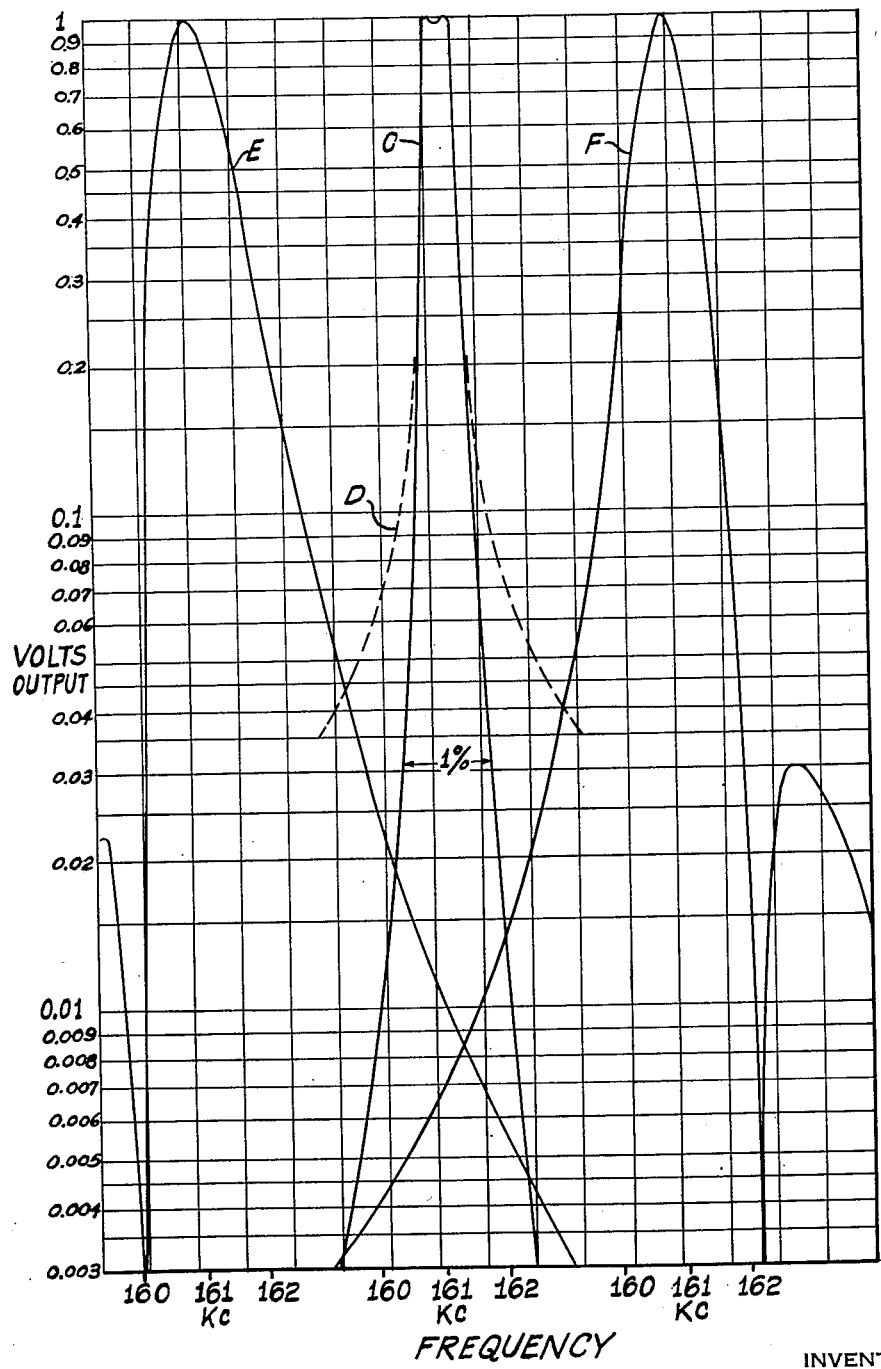
Fig. 3 is a set of curves characteristic of the operation of the Fig. 1 filter under various conditions.

Now referring to Fig. 1, which shows a twin ferrite differential filter according to this invention, two ferrite rods 1 and 2 are mounted inside a metallic shielding box 5, substantially symmetrically with respect to a transversely-extending metallic shielding partition 5' therein, by means of metallic shielding tubes 3 and 4 which are fastened to partition 5' and which fit closely around the central portions of the corresponding rods. In this way, rods 1 and 2 extend through partition 5' and the two end portions of each rod are on opposite sides of said partition, as shown.

The material of which the rods are made, ferrite, has good magnetostrictive action, and such material may be, for example, a mixture of zinc oxide, manganese oxide, and iron oxide, compressed and fired at around 1400° C. Such a material has high resistivity and low eddy current losses. Box 5, partition 5', and tubes 3 and 4 are made of any suitable metal (such as copper) which provides electrostatic or high-frequency shielding, this shielding not being effective for low frequencies or direct current.

The copper tubes 3 and 4 form part of the shielding 5 and 5', the purpose of which is to shield the output coils from the input coils, for a reason which will hereinafter appear. An input coil 6 is coupled to rod 1, and an input coil 7 is similarly coupled to rod 2, these coils being connected in series with each other and the free ends being brought out to a pair of input terminals 12 and 13, terminal 12 being connected to box 5 and thereby grounded. By connecting these input coils in series, a high impedance input circuit is provided. A variable condenser 10 is connected across input terminals 12 and 13 and also across the series combination of the two coils 6 and 7, for tuning purposes. An output coil 8 is coupled to rod 1 and an output coil 9 is similarly coupled to rod 2, these coils being connected in series with each other and the free ends being brought out to a pair of output terminals 14 and 15, terminal 14 being connected to box 5 and thereby grounded. A variable condenser 11 is connected across output terminals 14 and 15, and also across the series combination of the two coils 8 and 9, for tuning purposes.

Except for the holes in tubes 3 and 4, the shielding completely isolates the input circuit (coils 6 and 7 and tuning condenser 10) from the output circuit (coils 8 and 9 and tuning condenser 11). However, if the length of each of the tubes 3 and 4 is large compared to its diameter, the electrostatic coupling between input and output circuits is negligible, except by way of appreciable conductivity of the ferrite material itself, and this conductive coupling is eliminated by contact of the ferrite rods with the grounded tubes 3 and 4. Preferably, the portion of each ferrite rod within the corresponding tube is silver-plated to improve this contact, as well as to improve electromagnetic shielding. The electromagnetic shielding effect of the tubes also improves with increased ratio of length to diameter of the tubes, since the tubes act as wave guides operated far below cutoff, the silver-plating providing a second and similar wave guide and hence also improving the electromagnetic shielding effect of the tubes.

Coils 8 and 9 are connected in series opposing relation with respect to any voltage induced in the output circuit by the input circuit through the electromagnetic coupling afforded by the two ferrite rods acting as cores common to the input and output circuits. Hence, theoretically, the magnetic coupling between these two circuits can be balanced out, even without the attenuation provided by the wave guide tubes 3 and 4 and/or that provided by the silver plating around the central part of each ferrite rod. However, it is preferable to provide as much attenuation as possible, so that an accurate balance of the opposing output windings 8 and 9 is not necessary to achieve a rather small coupling between the input and output circuits.

If all electromagnetic coupling is eliminated, energy can pass through the filter only as a result of mechanical vibration of the ferrite rods. These rods are set in vibration by magnetostrictive action, which is produced by the combined action of an alternating current signal input in coils 6 and 7 and a direct current magnetic field along the lengths of the rods, produced either by a direct current component in these coils or by a plurality of permanent magnets 16 located preferably outside the shielding or box 5. When vibrating, the rods produce flux variations through coils 8 and 9, inducing voltages therein.

As described above, the two input coils 6 and 7, as well as the two output coils 8 and 9, are connected in series with each other. This manner of connection is an important feature of applicant's invention. At the resonant frequency of a rod, the effective resistance of its coil increases greatly.

Since the effective resistance of the rod's coil increases at the resonant frequency of the rod, if the input or driving coils were connected in parallel or in some manner other than in series the share of current received by each coil would be reduced at the time of the rod's resonant frequency, just at the time when such coil is relied upon to transmit signals. This is an unfortunate and extremely undesirable result, which is entirely eliminated by the connection of the input or driving coils in series according to this invention.

If the rods 1 and 2 vibrate in phase, the voltages induced in coils 8 and 9 oppose, due to the series opposition connection of such coils. But, if the rods vibrate in opposite phase, then the induced voltages add. The term "differential filter" is intended to indicate that output is produced only by differences between the bar vibrations. The theory of operation may be explained by reference to Figure 2. In Fig. 2, circle A is the locus, in the complex plane, of the voltage $e_1$ induced in coil 8 by vibration of rod 1, the circle being traced (assume counterclockwise, for the sake of definiteness) as the frequency of alternating current in coil 6 varies from zero to infinity.

Circle B is the corresponding locus for the voltage $e_2$ produced by the vibration of rod 2, but voltage $e_2$ is not shown relatively reversed because it is simpler to take account of the relative reversal of polarities of coils 8 and 9 by considering the resultant output voltage in the diagram of Fig. 2 as the line joining the heads of the two arrows.

The two circles are shown as having different diameters to correspond to ferrites of different activities, or slight differences in the locations of the coils on the two rods. The circles may be brought to the same diameter by moving the permanent magnets so as to increase the magnetostrictive action of the rod giving the smallest output, while simultaneously decreasing that of the other rod. The natural frequencies of the rods are made somewhat different so that over a certain band of frequencies one voltage is leading and the other lagging, as shown. Finally, the rate of tracing the two circles depends on the mechanical "Q" of the vibrating rods. The mechanical "Q" of the rods may be defined as the ratio of the stored energy to the loss of energy taking place during one radian of vibration. If the Q's of the two rods are alike and the circles of equal diameter, then the distance between the arrow heads decreases toward zero as the frequency becomes very low or very high. But, if, for example, the Q of rod 2 is greater than that of rod 1, and the circles are equal in diameter, then as the frequency increases above the resonant frequency of rod 2, the vector $e_2$ will overtake $e_1$ and give a zero output, while on decreasing frequency $e_1$ never catches up to $e_2$ and the output tapers off relatively slowly. Thus, a sharp cut off on either side of the pass band can be obtained by making one or the other Q slightly greater, although, of course, at the cost of a slower cut off on the other side of the pass band.

The pass band is largely determined by the Q's of the rods. For if the rods have very high Q, and it is attempted to obtain a broad band by making the natural or resonant frequencies of the rods widely different, there will be two separate responses, one for each rod, with a deep valley between. On the other hand, if the frequencies are very close together, only a single response will be obtained but its amplitude will be low. These two cases correspond to the action of a pair of coupled tuned circuits, in the first case the circuits being very much over-coupled, and in the second case much too loosely coupled. To obtain a result corresponding to critical coupling, the rod frequencies should be so chosen that voltages $e_1$ and $e_2$ are about 90° apart in phase at midband, i. e., at the geometric mean of the two rod frequencies. For all practical purposes, in this situation involving filter design, the geometric and arithmetic means are the same since the difference between the two frequencies is such a small percentage of the midband frequency. This gives a flat-topped response with band width equal to operating frequency divided by Q. Thus, if the filter is made for 100 kc. operation and the Q of the rods is 1000, the band width will be 100 cycles. In practice it may be preferable to put the rod frequencies a little further apart so as to obtain a slightly double-humped response, rather than a strictly flat-topped one.

In the foregoing it has been assumed that the rods have the very large values of Q (up to something like 1000) that are obtained with unloaded rods. These values are approached if the input and output coils are untuned, or if the magnetic field is weak so that there is very little reaction of the circuits upon the rods. But the coils should be tuned in order to reduce the response at frequencies remote from the band desired, and the magnetic field should not be so weak as to seriously reduce output. The best compromise value of magnetic field depends on the requirements. If the narrowest possible band is required, and output is of secondary importance, a weak magnetic field is indicated. If a broader band is desired, the magnetic field can be made stronger and the rods ground for a larger difference in frequency.

As compared with a lattice filter employing coils with ferrite cores as arms, the present filter has the advantage that both input and output circuits can have one side grounded, as shown in Fig. 1.

With a given diameter ferrite rod, the lower the frequency of operation the better the performance with respect to electromagnetic shielding between input and output circuits. This is because longer shielding tubes (3 and 4 of Fig. 1) can be used with a lower frequency or longer rod, and the attenuation of flux in decibels is proportional to the ratio of length to diameter of the shielding tubes.

In common with all filters having distributed constants, this filter responds at a plurality of bands. As constructed, its strongest response was at the third harmonic of the fundamental resonant frequency of the rods, but it also responded at other harmonics, although these other responses are attenuated by the tuning of the input and output coils. A very long rod cannot be used at high frequencies because in such case the various harmonic responses are too close together.

If there is any residual electromagnetic or electrostatic coupling between input and output circuits other than by rod vibration, the response curve may have less steep sides, or steeper sides, sometimes having a frequency of very high attenuation. It is probably desirable to avoid such stray coupling, however. In fact, as described above, electrostatic and electromagnetic coupling between input and output circuits must be substantially completely eliminated for successful operation of the filter in the desired manner.

Curve C in Fig. 3 shows the measured response of the differential filter of Fig. 1, with residual electromagnetic coupling nearly balanced out by a small auxiliary mutual inductance between input and output circuits (not shown in Fig. 1). Curve D (dotted) shows the slower falling off at the sides due to a small residual coupling that was present, presumably due to inequality of the ferrites, before the auxiliary mutual inductance was added. Curves E and F are included merely to show how manipulation of the magnetic fields can produce a sharp cut off on either side of the response curve. In these curves the electromagnetic coupling is probably much increased by unequal saturations of the cores, and the "circles" of Fig. 2 are of very different diameters, so that the flat top is lost and the operation is more like a single circuit. It has also been found possible to retain the flat-topped response and introduce a small coupling that gives a sharp cut off at two frequencies just above and below the pass band, though of course with decreased attenuation of frequencies beyond these rejection points. When the filter was so adjusted, the response curve was like curve C in its upper portion, but its sides came down to crevasses like curves E and F, except that the crevasses were not so deep.

Curve C was made several hours after the ferrites had been wetted during grinding. The curve was repeated after three days, during which the ferrites must have dried out and their Q's increased, for the peaks were then higher and the valley between dropped to half the peak voltage. Thus, if this particular pair of ferrites were to be used without reducing their Q's, the frequencies should be ground closer together to obtain closer to flat-top response.

The adjustment of the filter in the presence of appreciable electromagnetic coupling is complicated by the fact that adjusting the magnetic fields to make the circles of Fig. 2 equal affects not only the resonant frequencies of the rods, but also the magnetic coupling, by changing the relative degree of saturation of the ferrites considered as cores. It would probably be worth while to provide means for moving at least one coil on its core, or to build into the filter an adjustable mutual inductance between input and output circuits, since an exactly matched pair of ferrites is the exception rather than the rule. The ferrites are readily ground to a desired frequency by rubbing one end on emery cloth, but it is not so easy to grind the cross-section down to obtain a balance for the two opposing magnetic couplings, since it takes longer to test the results of each stage of grinding and it is difficult to tell whether more grinding is needed or if too much has been done. The phase of the alternating current output may be reversed by reversing the magnetic polarizing or biasing field.

The mechanical Q of the ferrites can be greatly lowered by moisture, or even by oil or wax. The resonant frequency can be affected by the same means. Both resonant frequency and Q fall if the ferrite is wet. Temperature effects are not serious—the resonant frequency falls about 30 parts in a million per degree C. rise in temperature. The resonant frequency rises with increasing magnetic field, and this is another complication in the adjustment of the filter, since the frequency may increase as much as one-half of one percent in strong magnetic fields, such as may be used for broad-band response. (Fortunately, in this case, the ferrites are ground to a greater difference of frequency, so this effect is least felt when the effect is greatest.)

Finally, a certain amount of skill and patience may be required to adjust the filter initially to give a desired response characteristic.

In the invention as so far described, there is disclosed a differential type of filter comprising a pair of magnetostrictive rods resonant to slightly different frequencies, driven by magnetostriction from an input circuit and delivering a band pass output to a pair of output coils shielded from the input coils and connected to be aiding for frequencies within the pass band but opposing for frequencies outside the band.

This filter has been shown to be the equivalent of a pair of coupled circuits, the advantage being that no mechanical coupling between the resonator rods is used, the equivalent of a very loose coupling being obtained simply by making the two resonant frequencies of the rods very close together.

It is difficult to place two coils on a single resonator without thereby introducing undesired mutual inductance, especially at higher frequencies, where the resonators are quite short in length, and also especially when ferrite resonators are used. A circuit arrangement for avoiding this difficulty is shown in Fig. 4. Input terminals 12 and 13 are connected to opposite ends of an inductive winding 17 across which a tuning condenser 18 is connected.

A first link circuit 19 couples the input circuit described to the output circuit, including terminals 14 and 15, while a second identical link circuit 20 couples the input circuit to the output circuit. Output terminals 14 and 15 are connected to opposite ends of an inductive winding 21 across which a tuning condenser 22 is connected. Link circuit 19 includes, in series, a pick-up coil 23 inductively coupled to winding 17, a coil 24 which surrounds and is inductively coupled to ferrite rod 1, an output coil 25 inductively coupled to winding 21, and a tuning condenser 26. Link circuit 20 includes, in series, a pick-up coil 27 inductively coupled to winding 17, a coil 28 which surrounds and is inductively coupled to ferrite rod 2, an output coil 29 inductively coupled to winding 21, and a tuning condenser 30. The couplings of the input and output circuits provided by link circuits 19 and 20 are made to oppose.

The link circuits 19 and 20 are identical, as previously stated. However, the rod resonators 1 and 2, which may be of ferrite, nickel, or nickel-plated aluminum, etc., are not identical, but are tuned respectively to the limits of the desired pass band. At the resonant frequency of a resonator of the type disclosed, such resonator acts, in effect, to introduce a high resistance in the coil surrounding it. Hence, at one limiting frequency of the band, a high resistance is coupled into one link, say 19, by the resonance of its magnetostrictive rod 1, so that the balance between the links is upset and large output is obtained at terminals 14 and 15. At the other limiting frequency of the band, a high resistance is coupled into link 20 by the resonance of its magnetostrictive rod 2, so that the balance between the links is similarly upset and large output obtained. Between the two limiting frequencies of the band, that is, between the resonant frequencies of the two resonators 1 and 2, increments of opposite signs are produced in the apparent reactances of the link circuits 19 and 20, since throughout this range of frequencies the two resonators are tuned respectively above and below the applied frequency. Therefore, the currents in these link circuits are of more or less different phase, whereby their outputs do not cancel in the common output circuit, and output is obtained at terminals 14 and 15.

On the other hand, when the applied frequency is well outside the limits of the pass band, the resonators 1 and 2 introduce small and nearly equal effects in the two links 19 and 20, so that their effects nearly cancel in the common output circuit.

As described above in connection with Figs. 1 and 3, it is possible, by making the resonators slightly unequal in activity, to produce a more or less complete balance at any given frequency outside the pass band, this effect being, of course, at the expense of attenuation of other frequencies. Also, as previously explained, to obtain fairly uniform response within the band (a fairly flat-topped response curve), the band width and the mechanical Q of the resonators must be so chosen that the band width, expressed as a fraction of the mid-band frequency, is in the vicinity of 1/Q.

While Fig. 4 shows the preferred electrical connections utilized, which call for only one coil coupled to each resonator, the same principle may be applied in various forms, one of which is illustrated in Fig. 5.

Referring to Fig. 5, input terminals 12 and 13 are connected to opposite ends of inductive coil 17 as before, tuning condenser 18 being connected across such coil. Instead of utilizing link circuits, coil 24 which is coupled to magnetostrictive rod 1, is directly inductively coupled to coil 17, as is also coil 28 which is coupled to magnetostrictive rod 2. Coils 24 and 28 are connected together in series across the output terminals 14 and 15, as are also the two tuning condensers 26 and 30, the common terminal of the two signal coils being connected to the common terminal of the two condensers by means of lead 31, to connect condenser 26 across only coil 24 and condenser 30 across only coil 28. Thus, there are provided a tuned primary winding 17 and two tuned secondaries 24 and 28. Windings 24 and 28 are coupled oppositely to coil 17.

In Fig. 5, the couplings between the primary and the two tuned secondaries are adjusted to produce zero output outside the pass band of the filter. Within the pass band, the action is similar to that of Fig. 4, unbalances between the two secondaries and an output being produced when the applied frequency is within such band.

Figure 6:
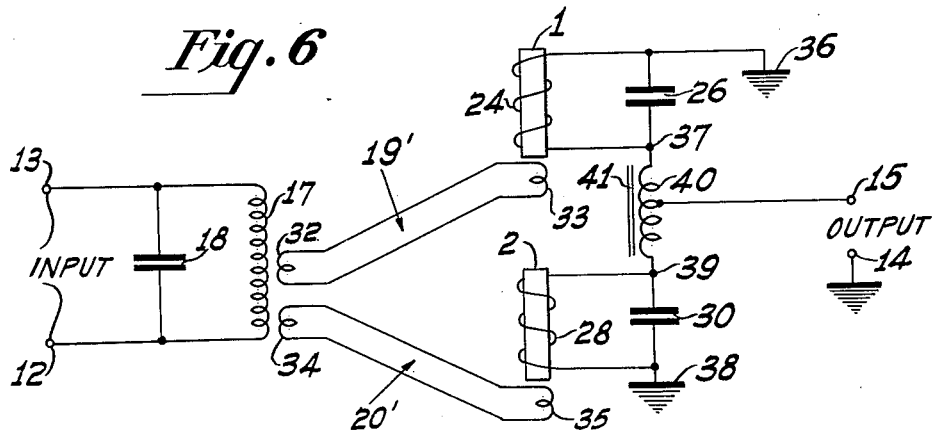

Fig. 6 shows still another circuit arrangement whereby a differential filter is provided, using only a single coil coupled to each resonator. As before, input terminals 12 and 13 are connected to opposite ends of inductive winding 17, across which tuning condenser 18 is connected. A link circuit 19', composed of two spaced coils 32 and 33 connected in series, couples winding 17 to coil 24 on resonator 1, coil 32 being inductively coupled to winding 17 and coil 33 being inductively coupled to coil 24. A similar link circuit 20', composed of two spaced coils 34 and 35 connected in series, couples winding 17 to coil 28 on resonator 2, coil 34 being inductively coupled to winding 17 and coil 35 being inductively coupled to coil 28.

One end of coil 24 is grounded at 36 and the opposite end is connected to a point 37, tuning condenser 26 being connected between point 37 and ground 36 or across coil 24. Similarly, one end of coil 28 is grounded at 38 and the opposite end is connected to a point 39, tuning condenser 30 being connected between point 39 and ground 38 or across coil 28. Windings 24 and 28 are oppositely coupled to coil 17. A center-tapped coil 40 on a ferromagnetic core 41 is connected between points 37 and 39, said coil being adjustable on its core. The center tap on coil 40 is connected directly to output terminal 15, the other output terminal 14 being grounded as shown.

The coil 40 connecting the two resonator circuits gives a net voltage of zero at its midpoint when the two circuit voltages are opposite in phase but equal in magnitude. The effective tapping point of terminal 15 on coil 40 can be varied by moving the coil 40 with respect to its core 41.

The operation of Fig. 6 is similar to that of Fig. 5, the chief difference being in the method of combining the voltages developed in the two ferrite-cored circuits. In Fig. 6, a better balance may be obtained than in Fig. 5, because in Fig. 6 both secondary circuits 24, 26 and 28, 30 are grounded.

Figure 7:
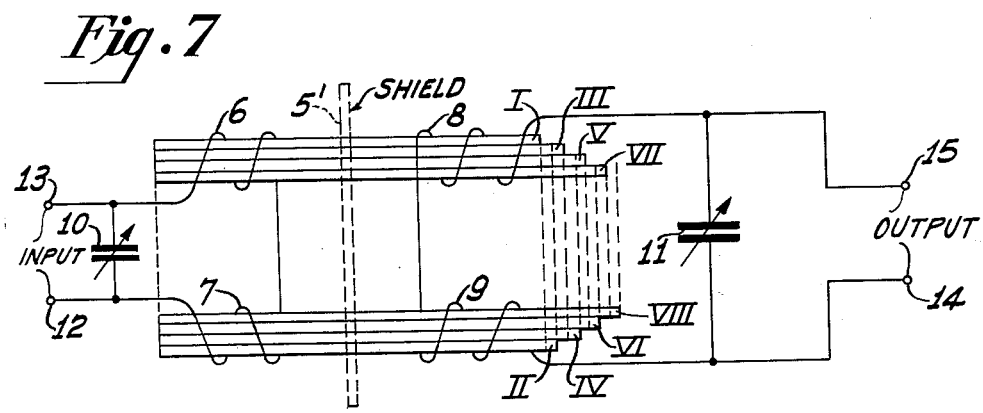
Fig. 7 is a schematic illustration of a modification of the structure of Fig. 1.

It has been stated above that, to obtain fairly uniform response within the pass band, the filter band width and the mechanical Q of the resonators must be so chosen that the band width, expressed as a fraction of the mid-band frequency, is in the vicinity of 1/Q. This limitation on the filter band width may be overcome by using a plurality of resonators in each coil, as illustrated in Fig. 7. With N pairs of resonators, the pass band, for a given resonator Q, may be increased by the factor N, and at the same time the attenuation outside the band becomes more rapid and complete. In fact, under these conditions the filtering becomes equivalent to that of an N-section filter of the conventional "ladder" type.

For this modification, the circuits of Figs. 1, 4, 5 or 6 previously described may be used, the only difference being that a bundle of resonators is provided in each coil. In Fig. 7, the Fig. 1 circuit is illustrated as being used. The resonator frequencies should be distributed uniformly throughout the desired pass band. If these resonators are numbered, I, II, III, etc., in order of increasing frequency or increasing length, the odd-numbered ones I, III, etc. are put in one driving coil 6 and output coil 8, and the even-numbered ones, II, IV, etc. in the other driving coil 7 and output coil 9, as shown in Fig. 7. If the resonators consist of nickel wire or nickel-plated aluminum or other wire, the whole number thereof required may be cut to proper length at one time by cutting across a row of wires along a line making a small angle with a line transverse to the lengths of the wires, the cutting line being chosen to make the difference, expressed in percent, between the lengths of the longest and shortest resonators equal to the width of the band desired, expressed in percent.

It was found that some difficulty occurred in the original differential filter of Figure 1 due to undesired coupling between input and output coils, especially if the resonators were made of ferrite. One way to overcome this difficulty is to make the resonators composite structures, comprising, for example, half-wave ferrite drivers cemented to the ends of a metal resonator which is one or more half-waves long. This puts the input and output coils on the ferrites further apart and permits better shielding between them, as well as permitting adequate electrostatic grounding of the metal part of the composite resonator structure, which part passes through the shielding 3 and 4 of Figure 1. By such a structure, separate input and output coils may be put on each of the two resonators with better shielding between them, thus rendering unnecessary resort to the arrangements of Figures 4–6. However, in such a composite structure, the filter is still only in effect a single-section filter.

Figure 8:
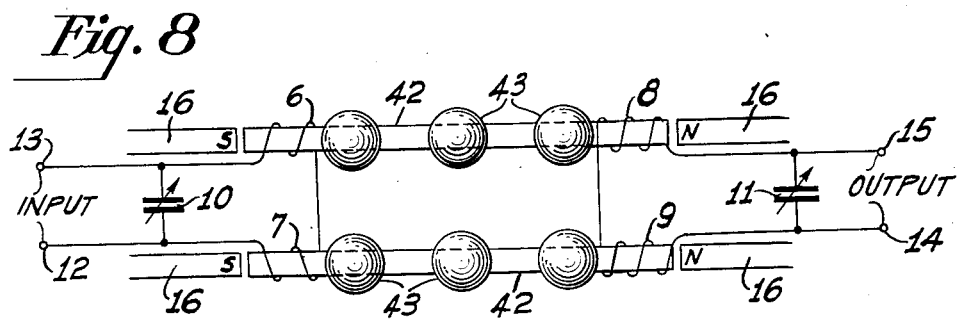
Fig. 8 is a further modification of the structure of Fig. 1.

The present invention also contemplates substituting a complete mechanical band pass filter of one or more sections for each of the simple resonators previously disclosed in Figure 1, the pass bands of the two filters, however, being somewhat displaced from each other but overlapping. Figure 8 shows the invention incorporating a pair of mechanical filters of a type described in my copending joint application, Serial Number 84,372, filed March 30, 1949. Each of these filters consists of a thin-walled nickel tube 42 on which are soldered steel balls 43 at uniform intervals. The diameter of each of these balls is in the vicinity of a quarter-wavelength.

The input or driving coils 6 and 7, and the output coils 8 and 9, are arranged and connected to the input and output terminals as in Figure 1. The driving and output coils are so connected and coupled, as previously described in connection with Figure 1, that the two output voltages (in coils 8 and 9) cancel outside the resultant pass band, the two output voltages being in phase in this region. Within such resultant band, the phase shifts in the two filters differ by a considerable amount (preferably by 180°), so that in this region the two output voltages add in the combined output circuit. To obtain this result, the pass bands of the two multiple section filters are displaced from each other a fractional amount determined by the reciprocal of the number of sections in each multiple section filter. The more sections, the less the "stagger" of the bands.

The performance of this combined multiple section and differential filter of Figure 8 is the same as a multiple section filter having the same total number of sections. It has the advantage, however, of being only half as long. The input and output circuits should be shielded, as previously described in connection with Figure 1, for example. Also, the filter outputs should be balanced for best attenuation immediately outside the overall pass band, for example by moving the permanent magnets, as previously described.

From the values given in Fig. 3, it may be seen that the filters of this invention are applicable to intermediate frequencies (I. F.) or low radio frequencies (R. F.).

The filters of this invention have various fields of use. For example, they may be used for interstage coupling between I. F. stages of a superheterodyne radio receiver, for filters in single side band (SSB) communication systems, in code communication systems, etc.

It may be seen, from the foregoing, that a filter has been devised which has a substantially flat-topped and steepsided characteristic, which will act as a narrow band pass filter at rather high frequencies, and one which accomplishes its filtering action by purely vibratory phenomena.

What I claim as my invention is:

1. An electromechanical band pass filter, comprising a pair of resonant magnetostrictive elements mounted for mechanical vibration and having different mechanical resonant frequencies, a common source of alternating current coupled to said elements to produce vibratory motion thereof at the frequency of said alternating current, separate inductive means coupled to each of said elements to convert the vibratory motion thereof into alternating voltages, the mechanical resonant frequencies of said elements being so chosen that the two alternating voltages developed in said inductive means are substantially 90° apart in phase at a vibratory frequency which is the geometric mean of the two resonant frequencies, whereby the width of the frequency band passed by said filter is equal to the operating frequency for which the filter is designed divided by the mechanical Q of the elements, and means coupling the two inductive means differentially to a common output circuit.

2. An electromechanical filter, comprising a pair of resonant magnetostrictive elements mounted for mechanical vibration and having mechanical resonant frequencies of the same order of magnitude but of two different values, a separate coil coupled respectively to each of said elements, an input transformer having a single primary winding adapted to be energized from a source of alternating current, an output transformer having a single secondary winding connected to output terminals, means connecting one of said coils in series with a secondary winding on said input transformer and with a primary winding on said output transformer, and means connecting the other of said coils in series with another secondary winding on said input transformer and with another primary winding on said output transformer.

3. An electromechanical filter, comprising a pair of resonant magnetostrictive elements mounted for mechanical vibration and having mechanical resonant frequencies of the same order of magnitude but of two different values, a single coil coupled respectively to each of said elements, an input transformer having a single primary winding adapted to be energized from a source of alternating current, an output transformer having a single secondary winding connected to output terminals, means connecting one of said coils in series with a secondary winding on said input transformer, with a condenser, and with a primary winding on said output transformer, and means connecting the other of said coils in series with another secondary winding on said input transformer, with a condenser, and with another primary winding on said output transformer.

4. An electromechanical filter, comprising a pair of resonant magnetostrictive elements mounted for mechanical vibration and having mechanical resonant frequencies of the same order of magnitude but of two different values, a separate coil coupled respectively to each of said elements, input terminals, output terminals, a first tuned circuit including one of said coils coupling the input terminals to the output terminals, and a second tuned circuit including the other of said coils coupling the input terminals to the output terminals, said first and second tuned circuits both being tuned to a frequency equal to the geometric mean of the first-mentioned different resonant frequencies.

5. An electromechanical filter, comprising a pair of resonant magnetostrictive elements mounted for mechanical vibration and having mechanical resonant frequencies of the same order of magnitude but of two different values, a separate coil coupled respectively to each of said elements, input terminals, output terminals, a first tuned circuit connected across said input terminals, a second tuned circuit connected across said output terminals, a third tuned circuit including one of said coils coupling said first tuned circuit to said second tuned circuit, and a fourth tuned circuit including the other of said coils coupling said first tuned circuit to said second tuned circuit, said first, second, third and fourth tuned circuits all being tuned to a frequency equal to the geometric mean of the first-mentioned different resonant frequencies.

6. An electromechanical band pass filter as defined in claim 1 wherein said common source of alternating current coupled to said elements to produce vibratory motion thereof includes a driving coil around each of said magnetostrictive elements, said driving coils being connected in series.

7. An electromechanical band pass filter as defined in claim 1 wherein said means coupling the two inductive means differentially to a common output circuit includes an output coil around each of said magnetostrictive elements, said output coils being connected in series.

8. An electromechanical band pass filter as defined in claim 1 wherein said common source of alternating current coupled to said elements to produce vibratory motion thereof includes a driving coil around each of said magnetostrictive elements, said driving coils being connected in series, and wherein said means coupling the two inductive means differentially to a common output circuit includes an output coil around each of said megnetostrictive elements, said output coils being connected in series.

9. An electromechanical band pass filter as defined in claim 1, and in addition a grounded metallic receptacle having a transverse partition which form high-frequency shields about the input and the output portions of the filter.

10. An electromechanical band pass filter as defined in claim 1 wherein said common source of alternating current coupled to said elements comprises a driving coil arranged to act on both of said elements, and a condenser connected across said coil.

11. An electromechanical band pass filter as defined in claim 1 wherein said means coupling the two inductive means differentially to a common output circuit comprises an output coil around each of said magnetostrictive elements, said output coils being connected in series, and a condenser connected across each of said coils.

12. An electromechanical band pass filter as defined in claim 1 wherein said common source of alternating current coupled to said elements comprises a driving coil arranged to act on both of said elements, and condenser connected across said coil, and wherein said means coupling the two inductive means differentially to a common output circuit comprises an output coil around each of said magnetostrictive elements, said output coils being connected in series, and a condenser connected across each of said coils.

13. An electromechanical band pass filter as defined in claim 1 wherein said common source of alternating current coupled to said elements comprises a single coil receptive to said source of alternating current, and a link circuit coupled between said single coil and each of said elements.

14. An electromechanical band pass filter as defined in claim 1 wherein said means coupling the two inductive means differentially to a common output circuit comprises a coil around each of said elements, a magnetic core and a center-tapped coil thereabout connected between said coils, a connection to the other ends of said coils, whereby an output is obtainable from said center tap and said connection.

15. An electromechanical band pass filter as defined in claim 1 wherein said common source of alternating current coupled to said elements comprises a single coil receptive to said source of alternating current, and a link circuit coupled between said single coil and each of said elements, and wherein said means coupling the two inductive means differentially to a common output circuit comprises a coil around each of said elements, a magnetic core and center-tapped coil thereabout connected between said coils, a connection to the other ends of said coils, whereby an output is obtainable from said center tap and said connection.

16. An electromechanical band pass filter as defined in claim 1 wherein each one of said pair of resonant magnetostrictive elements comprises a plurality of mechanically coupled individual resonator elements.

17. An electromechanical band pass filter as defined in claim 1 wherein each one of said pair of resonant magnetostrictive elements comprises a plurality of individual resonator elements tuned to the same frequency, and mechanical coupling elements connecting said resonator elements.

WALTER VAN B. ROBERTS.

REFERENCES CITED

The following references are of record in the file of this patent:

UNITED STATES PATENTS

| Number | Name | Date |
|---|---|---|
| 1,606,807 | Riegger | Nov. 16, 1926 |
| 1,703,171 | Purington | Feb. 26, 1929 |
| 2,018,358 | Hansell | Oct. 22, 1935 |
| 2,101,272 | Scott | Dec. 7, 1937 |
| 2,138,042 | Robinson | Nov. 29, 1938 |
| 2,318,417 | Phelps | May 4, 1943 |
| 2,501,488 | Adler | Mar. 21, 1950 |